No. 848,081. PATENTED MAR. 26, 1907.
A. S. WILY.
STEAM COOKER.
APPLICATION FILED FEB. 8, 1905.

Witnesses
Arthur S. Wily, Inventor
By Attorneys Bird & Tarbox

UNITED STATES PATENT OFFICE.

ARTHUR S. WILY, OF NEW YORK, N. Y.

STEAM-COOKER.

No. 848,081.  Specification of Letters Patent.  Patented March 26, 1907.

Application filed February 8, 1905. Serial No. 244,686.

*To all whom it may concern:*

Be it known that I, ARTHUR S. WILY, a citizen of the United States, and a resident of the borough of Manhattan, city, county, and State of New York, have invented certain new and useful Improvements in Steam-Cookers, of which the following is a specification accompanied by drawings.

This invention relates to the form of cooker designed to operate by steam and adapted to be transported readily from place to place; and the objects of the invention are to provide a pot for cooking which shall be so constructed that the portion containing the articles which are being cooked shall be completely enveloped with the steam and a device which will be light, durable, and economical to manufacture, and of few parts.

Further objects of the invention will hereinafter appear; and to these ends the invention consists of the steam-cooker as a new article of manufacture for carrying out the above objects embodying the device of construction and combination of elements and arrangement of parts substantially as hereinafter fully described and claimed in this specification, and shown in the accompanying drawings, in which—

Figure 1:
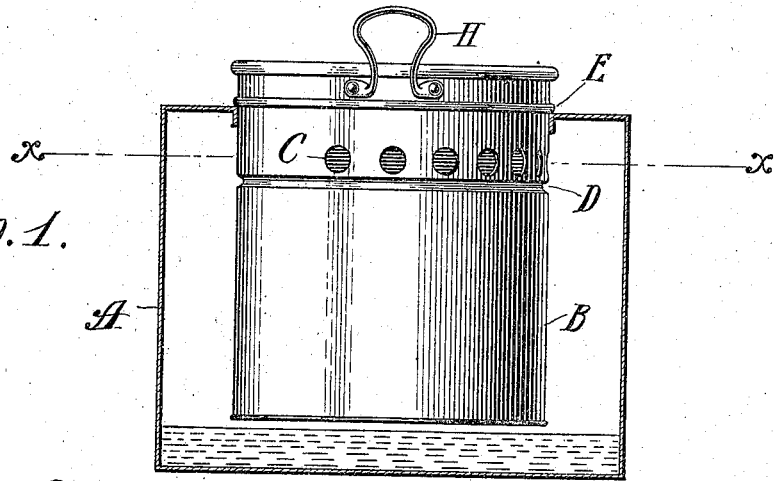
Figure 2:
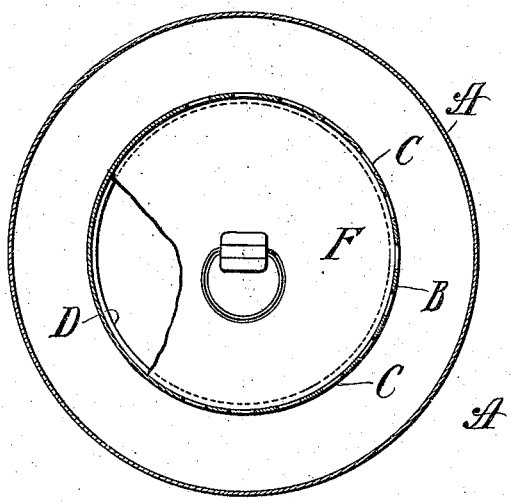
Figure 3:
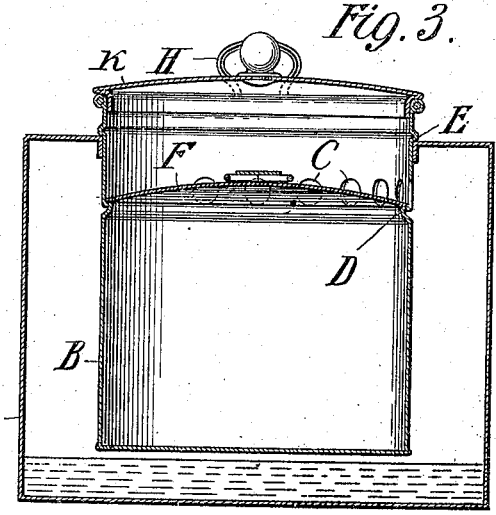
Figure 4:
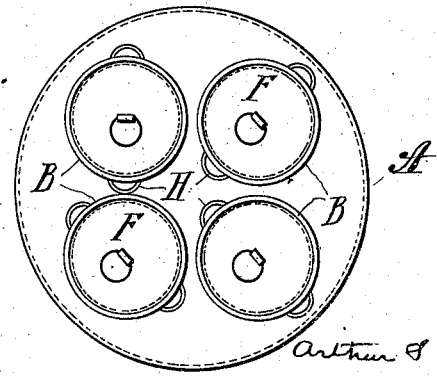

Figure 1 is a section of a boiler or steam-generator, showing the pot in side elevation. Fig. 2 is a horizontal section on the plane of the line X X of Fig. 1. Fig. 3 is a central vertical section through both pot and boiler. Fig. 4 is a plan view, on a smaller scale, showing a plurality of pots in a single boiler.

The invention consists of a boiler A, which may be made of galvanized sheet-iron, tin, or other suitable material. B is a pot which may also be made from the same or other suitable material. This pot is provided on the inside with an annular shoulder D at a convenient distance from the top. Immediately above this annular shoulder are provided holes. These holes extend about two-thirds of the way around the pot, leaving a space free from holes in order to allow of the pouring out of the contents of the pot. As near the top as construction will allow there is provided an exterior annular shoulder E.

F represents an inside cover or horizontal partition which is adapted to rest upon the shoulder D and fits snugly against the sides of the pot. K represents a cover for the top of said pot. When in use the pot is supported in the mouth of the boiler by the exterior annular shoulder E and fits snugly in the mouth, so as to prevent the escape of steam. One or more handles H are affixed at the top of the pot to facilitate its removal from the boiler. The pot is of such depth that it allows sufficient space between its bottom and the bottom of the boiler for enough water to carry out the cooking process; but the water does not touch the pot at any point, and the cooking is carried on entirely by the steam which rises around the sides of the pot and penetrates the holes C, and thus envelops on all sides that portion of the pot containing the articles which are being cooked. The inner cover F is curved, as shown in Fig. 3, so as to drain off through the holes C any moisture resulting from condensation of the steam in that portion of the pot, thus permitting any such moisture to be used over again for conversion into steam.

In Fig. 4 I show a larger boiler provided with a plurality of openings and pots, so that a number of different articles can be separately cooked at the same time with the same steam.

I know that there are many varieties of steam-cookers; but as far as I am aware never yet has any device been constructed by which the entire portion of the pot containing the articles being cooked is enveloped in steam, while at the same time a portion of the pot is exposed outside the steam-generating vessel. Obviously some features of this invention may be used without others, and the invention may be embodied in widely-varying forms.

Therefore, without limiting the invention to the construction shown and description, nor claiming equivalents, I claim, and desire to secure by Letters Patent, the following:

A cooker comprising a boiler, having a mouth in the top thereof and a pot adapted to be snugly suspended in said mouth; said pot being provided with an inside horizontal upwardly-curved partition and means for removably retaining the same intermediate the top and bottom of said pot, and also provided with a series of holes extending completely around the pot and located so as to admit steam only above the said horizontal partition and at the same time act as vents for carrying off condensed steam from said partition.

In testimony whereof I have signed my name to this specification in the presence of two subscribing witnesses.

ARTHUR S. WILY.

Witnesses:
EDWIN N. WHITFIELD,
OTIS M. MACMILLAN, Jr.